United States Patent
Hile et al.

(10) Patent No.: US 9,453,422 B2
(45) Date of Patent: Sep. 27, 2016

(54) DEVICE, SYSTEM AND METHOD FOR PREVENTING LEAKAGE IN A TURBINE

(71) Applicant: General Electric Company, Shenectady, NY (US)

(72) Inventors: Michael Alan Hile, Cincinnati, OH (US); Brian Agnew, Sharonville, OH (US); James Hamilton Grooms, Hamilton, OH (US); Richard William Jendrix, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 823 days.

(21) Appl. No.: 13/790,758

(22) Filed: Mar. 8, 2013

(65) Prior Publication Data

US 2014/0286756 A1    Sep. 25, 2014

(51) Int. Cl.
*F01D 5/02* (2006.01)
*F01D 5/30* (2006.01)

(52) U.S. Cl.
CPC ........... *F01D 5/3015* (2013.01); *F01D 5/3084* (2013.01); *F01D 5/3092* (2013.01); *F05D 2300/50212* (2013.01); *Y02T 50/672* (2013.01); *Y10T 29/49321* (2015.01)

(58) Field of Classification Search
CPC .. F01D 11/006; F01D 5/3015; F01D 5/3084; F01D 5/3092; B23P 15/006; Y10T 29/49321; F05D 2300/50212; Y02T 50/672
USPC ...................................................... 416/219 R
See application file for complete search history.

(56) References Cited

U.S. PATENT DOCUMENTS

| | | |
|---|---|---|
| 3,814,539 A | 6/1974 | Klompas |
| 4,051,585 A | 10/1977 | Walker et al. |
| 4,084,922 A | 4/1978 | Glenn |
| 4,094,615 A | 6/1978 | Glenn |
| 4,102,602 A | 7/1978 | Rottenkolber |
| 4,111,603 A | 9/1978 | Stahl |
| 4,142,836 A | 3/1979 | Glenn |
| 4,207,029 A | 6/1980 | Ivanko |
| 5,222,865 A | 6/1993 | Corsmeier |
| 5,277,548 A | 1/1994 | Klein et al. |
| 5,372,481 A | 12/1994 | Boyd |
| 5,405,245 A | 4/1995 | Cornelius |
| 5,431,541 A | 7/1995 | Shaffer |
| 5,435,693 A | 7/1995 | Shaffer |
| 5,580,219 A | 12/1996 | Frey et al. |
| 5,743,713 A | 4/1998 | Hattori et al. |
| 2009/0257875 A1 | 10/2009 | McCaffrey et al. |
| 2010/0189556 A1 | 7/2010 | Propheter-Hinckley et al. |
| 2011/0038734 A1 | 2/2011 | Marra |
| 2013/0171001 A1 | 7/2013 | Garcia-Crespo |

FOREIGN PATENT DOCUMENTS

GB              914548 A        1/1963

OTHER PUBLICATIONS

PCT Search Report and Written Opinion issued in connection with corresponding Application No. PCT/US2014/013710 on Nov. 11, 2014.

*Primary Examiner* — Zelalem Eshete
(74) *Attorney, Agent, or Firm* — General Electric Company; Brian P. Overbeck

(57) ABSTRACT

A turbine disk and blade assembly comprises a turbine disk including a plurality of disk posts extending radially therefrom and a plurality of disk slots between adjacent disk posts. The turbine disk is of a first material having a first coefficient of thermal expansion. The assembly further comprises a plurality of turbine blades. One of the turbine blades is received in each disk slot. The turbine blades are of a second material having a second coefficient of thermal expansion. The assembly further comprises a plurality of seal plates, wherein one of the seal plates is positioned in each disk slot radially inward of the turbine blade. The seal plates are of a material having a coefficient of thermal expansion substantially similar to that of either the disk posts or the turbine blade.

16 Claims, 5 Drawing Sheets

DEVICE, SYSTEM AND METHOD FOR PREVENTING LEAKAGE IN A TURBINE

TECHNICAL FIELD

The subject matter disclosed herein relates generally to preventing leakage in a turbine, and more specifically, to preventing leakage of air between adjacent turbine components.

BACKGROUND

The aircraft and aircraft engine industry consistently seeks to make improvements to increase fuel efficiency, or reduce specific fuel consumption (SFC) of its technology. Like the automobile industry, much of the efforts to reduce SFC in the aircraft and aircraft engine industry have focused on increasing the overall efficiency of the engine itself. In striving towards that goal, much of the attention is also directed towards reducing the overall weight of the engine. Due to advances in materials design, much attention has been focused on replacing heavier, metal parts with lighter materials, such as ceramic and composite materials, that can withstand the heat and forces that occur in an aircraft turbine engine. While replacing certain parts of the engine with a lighter material reduces the weight of the engine, certain issues arise when the materials are exposed to the high temperature environment within the aircraft engine. One of the issues is the disparity of relative thermal expansions between metal parts and parts made of, for example, ceramic or composite materials. When a metal part is adjacent a part made of a ceramic or composite material, the metal and ceramic or composite parts will expand a different amount and at a different rate, thereby potentially creating unwanted space therebetween. Depending on the location within the engine of the unwanted space or opening, the space or opening may lead to air leaks or other airflow issues therein. Leaks and other airflow issues may reduce the efficiency and therefore increase the SFC of the engine. Therefore, there is a need in the art for a device and method to counteract the disadvantageous behavior of materials used in turbines which have disparate coefficients of thermal expansion.

SUMMARY

It is therefore desirable to provide a device and method to prevent leakage of air between components of a turbine. In one embodiment, a turbine disk and blade assembly is provided and comprises a turbine disk including a plurality of disk posts extending radially therefrom and a plurality of disk slots between adjacent disk posts. The turbine disk is of a first material having a first coefficient of thermal expansion. The assembly further comprises a plurality of turbine blades. One of the turbine blades is received in each disk slot. The turbine blades are of a second material having a second coefficient of thermal expansion. The assembly further comprises a plurality of seal plates, wherein one of the seal plates is positioned in each disk slot radially inward of the turbine blade. The seal plates are of a material having a coefficient of thermal expansion substantially similar to that of either the disk posts or the turbine blade such that the seal plates thermally expand or contract an amount similar to a thermal expansion or contraction of at least one of the plurality of turbine disk posts or the plurality of turbine blades.

A system for preventing air leakage within a turbine is provided. The system comprises the disk and blade assembly as disclosed above and a sealing member coupled with at least a portion of the assembly and configured to seal the disk slots. In one embodiment, when the assembly experiences a change in ambient temperature, the sealing member follows the thermal expansion or contraction of at least a portion of the assembly and maintains the seal of the disk slots.

A method of assembling a turbine blade and disk assembly is also provided. The assembly comprises a turbine disk including a plurality of disk posts extending radially therefrom and a plurality of disk slots between adjacent disk posts. The turbine disk and disk posts are of a first material having a first coefficient of thermal expansion. The assembly further comprises a plurality of turbine blades. Each turbine blade is of a second material having a second coefficient of thermal expansion. The method comprises positioning one turbine blade in each disk slot, and positioning one seal plate in each disk slot radially inward of each turbine blade. Each seal plate is of a material having a coefficient of thermal expansion substantially similar to that of either the disk posts or the turbine blades such that the seal plates thermally expand or contract an amount similar to a thermal expansion or contraction of at least one of the plurality of disk posts or the plurality of turbine blades.

A method of preventing air leakage within a turbine is further provided. The method comprises assembling a disk and blade assembly. The assembly comprises a turbine disk including a plurality of disk posts extending radially therefrom and a plurality of disk slots between adjacent disk posts. The turbine disk and disk posts are of a first material having a first coefficient of thermal expansion. The assembly further comprises a plurality of turbine blades. Each turbine blade is of a second material having a second coefficient of thermal expansion. The assembling step further comprises positioning one turbine blade in each disk slot, and positioning one seal plate in each disk slot radially inward of each turbine blade. Each seal plate is of a material having a coefficient of thermal expansion substantially similar to that of either the disk posts or the turbine blades such that the seal plates thermally expand or contract an amount similar to a thermal expansion or contraction of at least one of the plurality of disk posts or the plurality of turbine blades. The method further comprises coupling a sealing member with at least a portion of the assembly such that the sealing member seals at least a portion of each disk slot.

DETAILED DESCRIPTION OF THE DRAWINGS

Figure 1:
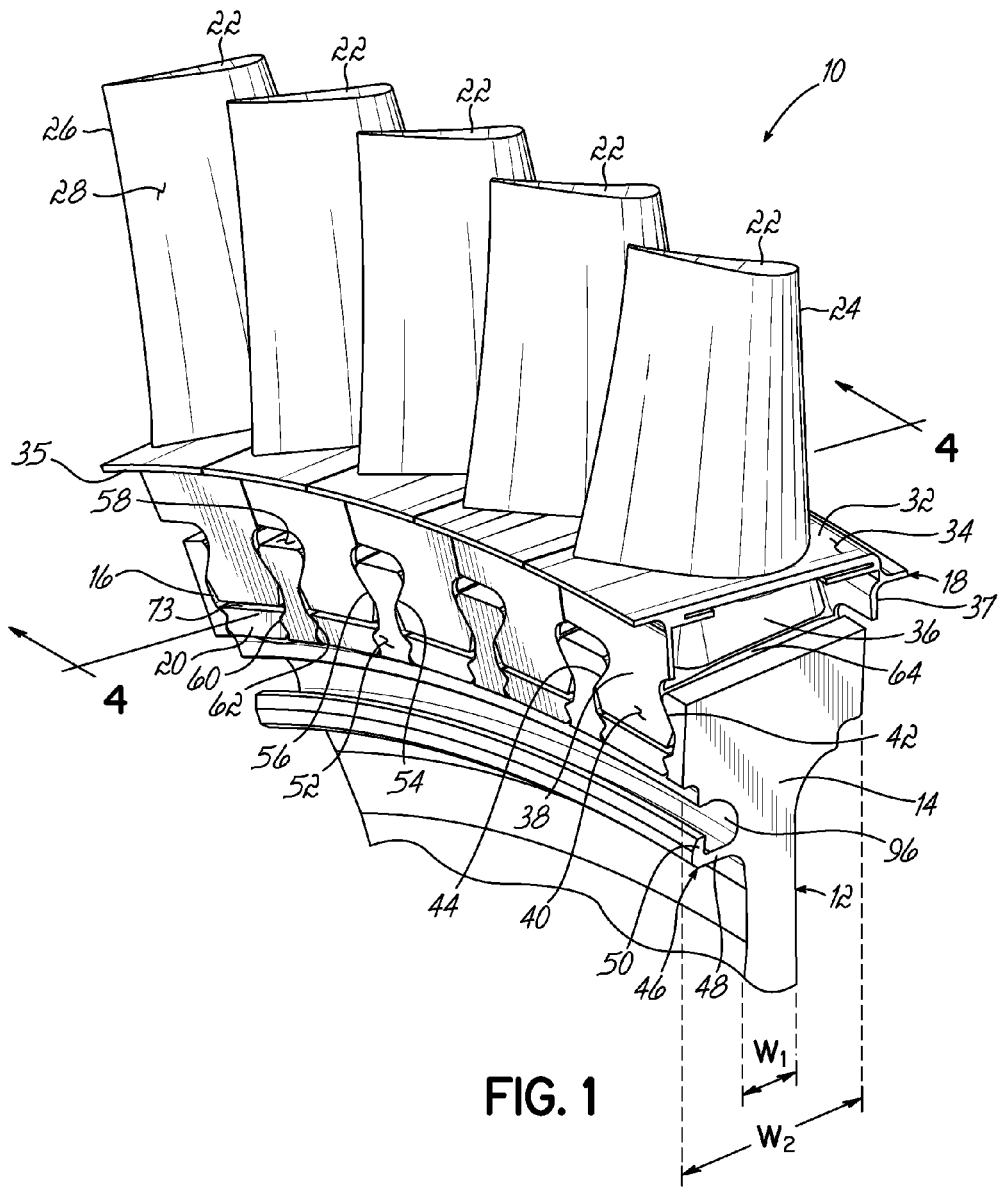
FIG. 1 is a perspective view of one embodiment of a disk and blade assembly including an embodiment of a seal plate.
Figure 2:
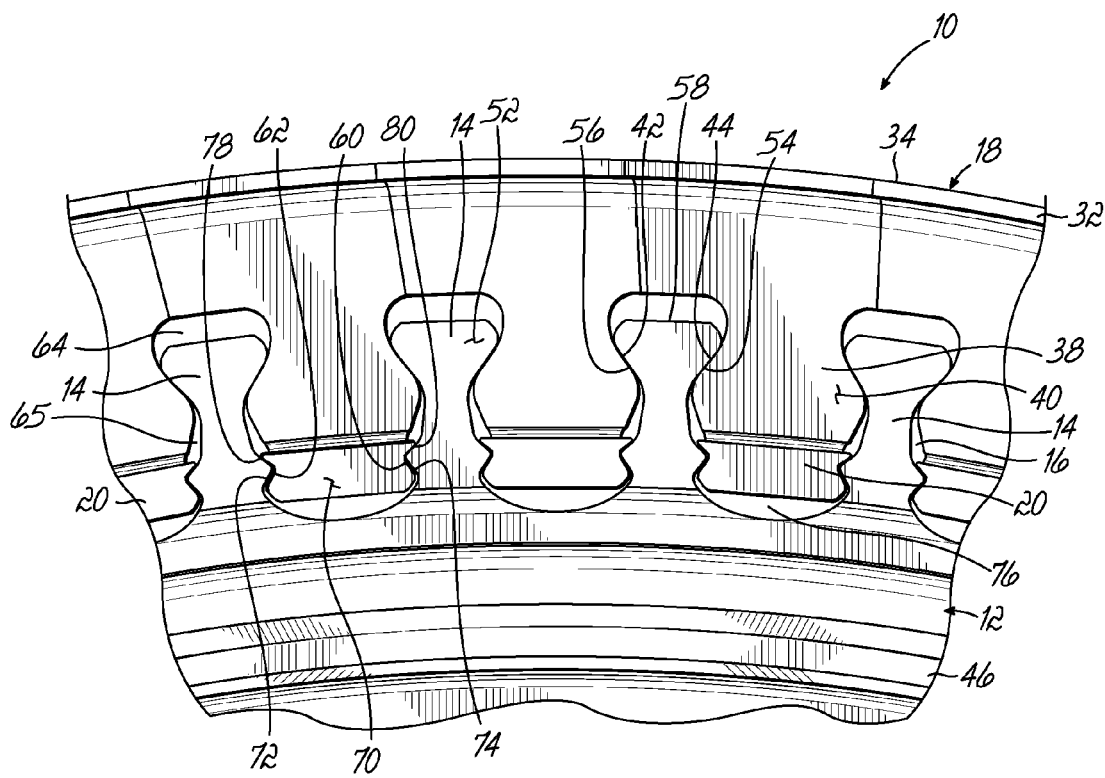
FIG. 2 is an aft view of the disk and blade assembly of FIG. 1.

A portion of a disk and blade assembly 10 is shown in FIGS. 1 and 2. It should be appreciated that while a portion of the disk and blade assembly 10 is shown, the disk and blade assembly 10 may extend circumferentially to be a complete assembly. In one embodiment, for example, the turbine disk 12 includes sixty-two disk posts 14 and sixty-two disk slots 16, and the sixty-two disks slots 16 receive sixty-two turbine blades 18 and sixty-two seal plates 20, thereby completing a circumferentially complete assembly. However, depending on the application, the number of each may be different than sixty-two. As disclosed herein, "posts" and "disk posts" are used interchangeably. As disclosed herein, "turbine blades" and "blades" are used interchangeably. As disclosed herein, "turbine disk" and "disk" are used interchangeably. As disclosed herein, "slots" and "disk slots" are used interchangeably. Similarly, "seal plates" and "plates" are used interchangeably.

The invention is particularly advantageous for preventing leakage due to thermal growth in the axial direction in a disk and blade assembly. For this reason, the system and method is described herein with a frame of reference to such components. Moreover, terms such as forward, aft, radial, circumferential and axial are used to describe the system in the chosen frame of reference. The invention, however, is not limited to the chosen frame of reference and descriptive terms, and may be used on components other than a disk and blade assembly, and in other orientations. Those of ordinary skill in the art will recognize that descriptive terms used herein may not directly apply when there is a change in the frame of reference. Nevertheless, the invention is intended to be independent of location and orientation within a turbine and the relative terms used to describe the system and method are to merely provide an adequate description of the invention.

Figure 4:
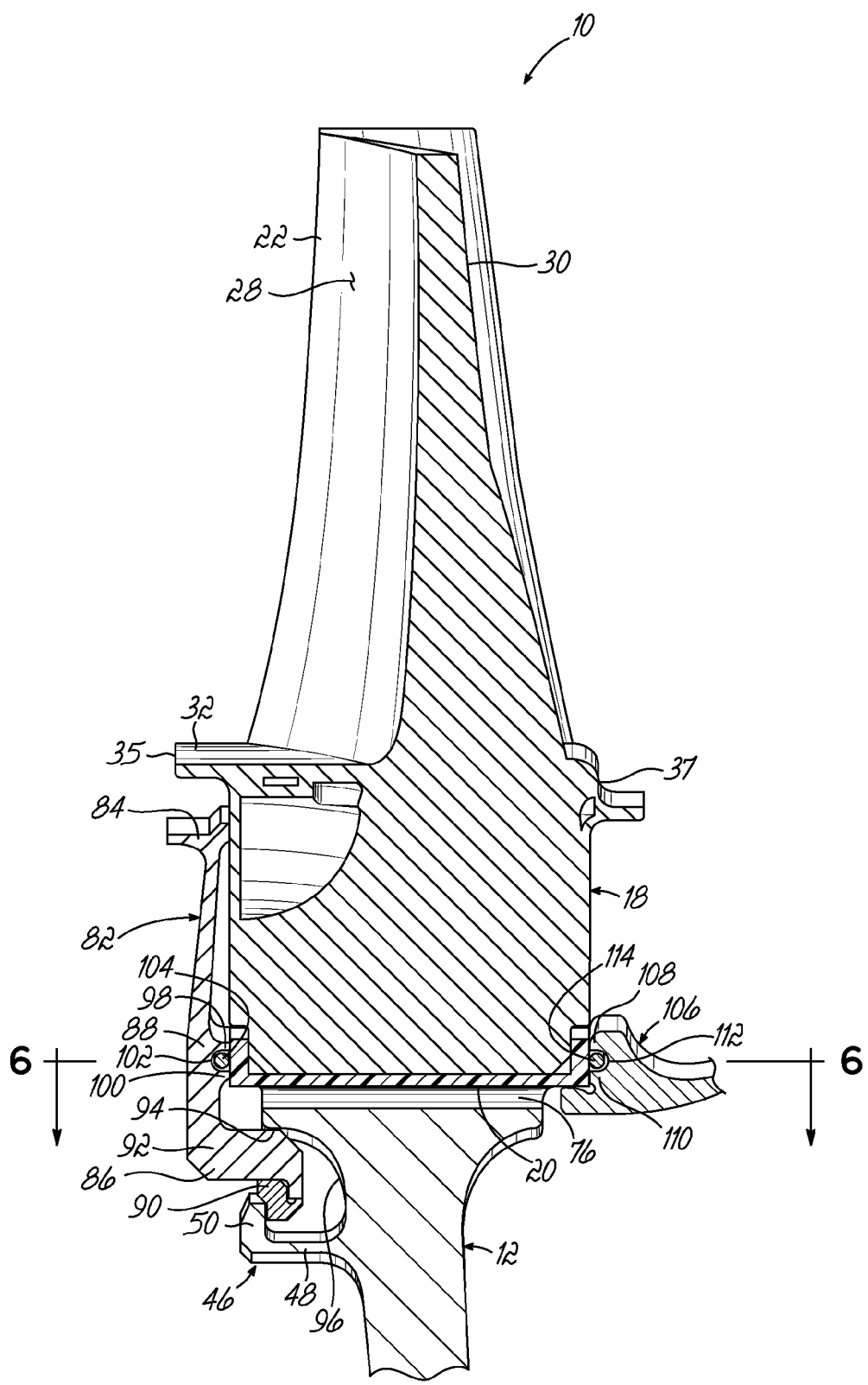
FIG. 4 is a side cross-sectional view of one embodiment of a system for preventing air leakage within a turbine taken the line 4-4 of FIG. 1.

At the most radially outward portion of the assembly 10, the blades 18 include airfoils 22. The airfoils 22 each include a leading edge 24, a trailing edge 26, an aft side 28 and a forward side 30 (FIG. 4). The configuration of the airfoil 22 as shown in FIG. 1, such as the angle and shape, is an example of one configuration that is possible in the use of a turbine, for example. Alternative configurations of the airfoil 22 for alternative applications will be readily apparent to persons skilled in the art. The blade 18 further includes a platform portion 32 radially inward of the airfoil 22. In one embodiment, the platform 32 contains a top surface 34, bottom surface (not shown), and forward and aft portions 37, 35. Radially inward of the platform 32 is the shank portion 36. Even more radially inward, the blade 18 includes a dovetail portion 38. The dovetailed portion 38 includes a forward face (not shown), an aft face 40, first and second pressure faces 42, 44 and a bottom face (not shown).

Beginning at the center (not shown) of the assembly 10 and extending radially outward therefrom is a disk 12 including an axial width $w_1$. Extending from the disk 12 axially in the aft direction is a lip member 46. The lip member 46 includes a first portion 48 extending axially from the disk 12, and a second portion 50 extending in the radially outward direction away from the first portion 48. Extending radially outward from the disk 12 is a plurality of posts 14. Preferably, the posts 14 may be equally circumferentially spaced about the disk 12 and may include substantially equal dimensions such as lengths and substantially identical shapes. The posts 14 more specifically include a forward face 51, an aft face 52, first and second pressure faces 54, 56, and a top face 58 and a width $w_2$. At a radially inward portion of each pressure face 54, 56 near the disk 12, the posts 14 include lobes 60, 62 extending in opposite circumferential directions. Preferably, at least a portion of the post 14 includes a dovetailed portion 38 radially outward of the lobes 60, 62. There is a space 64 radially outward of the disk post top face 58, inward of the platform 32, and circumferentially between adjacent blade shanks 36.

In between the posts 14 are slots 16. More specifically, a slot 16 as referred to herein is defined as a space between two posts 14. Therefore, a shape of at least a portion of the slots 16 are complementary to at least a portion of the posts 14. At least a portion of each slot 16 is a generally dovetail shape. Each slot 16 is configured to receive a portion of a blade 18. More specifically, the dovetail shaped portion 65 of the slot 16 receives the dovetailed portion 38 of the blade 18. Even more specifically, a blade 18 may be situated in a slot 16 such that the first pressure face 42 of the blade 18 interacts with the second pressure face 56 of a post 14, and the second pressure face 44 of the blade 18 interacts with the first pressure face 54 of a circumferentially adjacent post 14.

Figure 3:
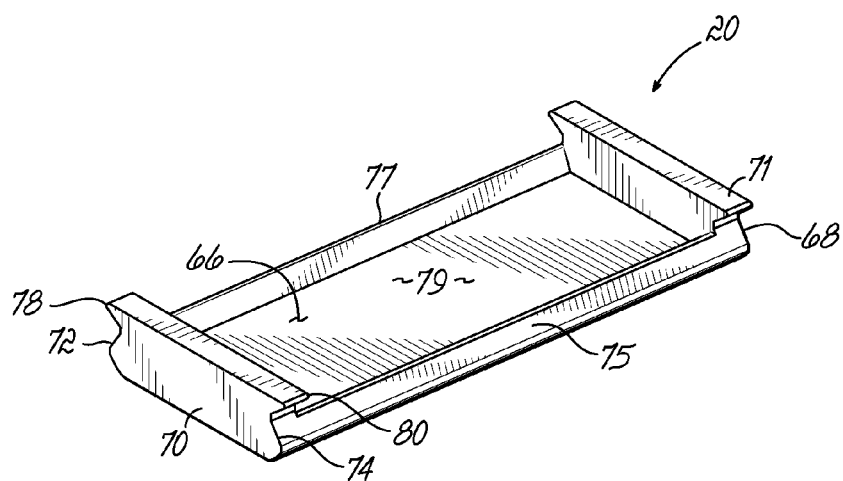
FIG. 3 is a perspective view of the seal plate of FIG. 1.

The assembly 10 further includes a plurality of plates 20. Preferably, one plate 20 is received into each slot 16 in generally radially inward portion of the slot 16 and radially inward of the dovetailed portion 38 of the blade 18. The plate 20 is received in the slot 16 and is prevented from moving in the radially inward direction, which is described in more detail below. More specifically, as shown in FIGS. 1-3, the plate 20 includes a bottom portion 66, forward and aft faces 68, 70, each face extending in the radially outward direction from the bottom surface 66 at opposite ends thereof, and first and second generally curvilinear edges 72, 74 extending from the bottom surface 66 at opposite sides thereof and between the forward and aft faces 68, 70 to top surfaces 71, 73. Sidewalls 75, 77 provide a space 79 in the plate 20. The plates are prevented from moving in the radially outward direction by the interaction between the sidewalls 75, 77 and lobes 60, 62. The space between the bottom portion 66 of the plates and the disk 12 may be referred to as the slot bottom flow area 76.

The generally curvilinear edges 72, 74 define a lip 78, 80 on each side of the plate 20. Preferably, the lips 78, 80 interact with the lobes 62, 60 of the posts 14 such that the plate 20 is thereby prevented from moving in the radially inward direction. As shown in FIGS. 1 and 2, the slots 16 (and thus the pressure faces 54, 56 of the posts 14) include at least a portion which has a shape which is generally complementary to a portion of the plates 20. Preferably, the slots 16 (and thus the pressure faces 54, 56 of the posts 14) include at least a portion which has a shape generally complementary to the generally curvilinear edges 74, 72 of the plates 20. Preferably, each plate 20 receives at least a portion of a blade 18.

In a preferred embodiment, the assembly 10 comprises different materials such that the disk 12 and posts 14 comprise a first material having a first coefficient of thermal expansion $\alpha_1$ and the blades 18 comprise a second material having a second coefficient of thermal expansion $\alpha_2$. Preferably, the plates 20 comprise a material having a same or substantially similar coefficient of thermal expansion as either the disk 12 and posts 14 or the blades 18. More preferably, the plates 20 comprise a material having a substantially similar or same coefficient of thermal expansion as the posts 14 for reasons described in more detail hereinbelow. Alternatively, the plates 20 comprise the first material such that the coefficient of thermal expansion of the plates 20 matches, or is equal to, the coefficient of thermal expansion of the posts 14. Persons skilled in the art should appreciate that "thermal expansion" as discussed herein refers to both thermal expansion and thermal contraction as experienced by a material due to an increase or a decrease in temperature.

In a preferred embodiment, the blade 18 is one integral component made of a material such a ceramic or composite material such as CMC that may withstand high temperatures that occur in a turbine. In an alternative embodiment, however, the blade 18 may comprise an inner portion comprising one material, such as metal, and a second coating portion comprising a different material, such as ceramic or composite. The disk 12 and the posts 14 preferably comprise a different material than the blades 18, such as a metal material. The choice of the type of metal for the disk 12 and the posts 14 will be specific to the type of application involved and the environment to which the assembly 10 will be exposed. For example, if the assembly 10 is employed in a stage 1 or stage 2 portion of a turbine combustion engine, the assembly 10 may need to be comprised of materials which are able to withstand extremely high temperatures, such as those experienced in a stage 1 or stage 2 portion of a turbine combustion engine, for example.

In an alternative embodiment, however, the material configurations could be different. For example, the blades 18 may be made of a metal material, and the disk 12, posts 14 and plates 20 may be comprised of a ceramic or composite material.

The advantages of the plates 20 having such material characteristics will be discussed in more detail hereinbelow.

Referring to FIG. 4, a system of preventing air leakage in a turbine is shown. The system includes the disk and blade assembly 10 as substantially described herein. The aft side of the system includes a first sealing member 82 having a first end 84, a second end 86, and a middle portion 88 between the first and second ends 84, 86. The sealing member 82 is an essentially annular member that is disposed circumferentially along the assembly 10 and concentrically relative to a center axis (not shown) of the disk 12. In the embodiment shown in FIG. 4, the first end 84 of the sealing member 82 couples with the blades 18, the second end 86 of the sealing member 82 couples with the disk 12, and the middle portion 88 couples with the plates 20 and the posts 14. More specifically, the second end 86 of the first sealing member 82 includes a retaining ring 90 that couples with the lip portion 46 of the disk 12 and a forward axially extending portion 92 that couples with an upper portion 94 of the lip channel 96 of the disk 12. These couplings at the second end 86 of the sealing member 82 may provide a reactive force to prevent the first end 84 from moving in the aft axial direction, thereby maintaining the axial position of the blades 18 relative to the rest of the assembly 10.

The sealing member 82 is configured to seal the slots 16. More specifically, the sealing member 82 extends a sufficiently radially outward length from the disk 12 to thereby envelop a portion of the assembly 10, including the slots 16. The couple between the first end 84 of the first sealing member 82 and the blades 18 and the second end 86 of the sealing member 82 and the disk 12 provides for a seal of the slot 16 in an axial direction. More specifically, the blade 18 may be naturally urged in the aft direction during the functioning of the turbine, or during thermal expansion. Thereby, the blade may attempt to urge the first sealing member in the aft direction. Due to the retaining ring 90 interacting with the second portion 50 of the lip 46 as shown in FIG. 4, the first sealing member 82 is fixed in place. The middle portion 88 of the sealing member 82 includes a forward axially extending pair of appendages 98, 100 that define a channel 102 therebetween. The middle portion 88 is positioned such that it is adjacent and intersects the aft face 68 of each plate 20 and the aft face 52 of each post 14. In the channel 102 of the first sealing member 82 is a first wire 104.

On the second, or forward side of the system is a second sealing member 106. The second sealing member 106 is configured to seal at least the slot bottom flow area 76 on the second or forward side. Preventing the leakage from the slot bottom flow area 76 is particularly important since the air that flows and leaks across the slot bottom flow area 76 has been pressurized by the compressor. Rather than going towards driving the turbine, this leaked air is essentially wasted, thereby reducing engine efficiency.

More specifically with respect to the second sealing member 106, the sealing member 106 envelops a portion of the plates 20, the posts 14, and fully envelops the slot bottom flow area 76, which is the portion of the slot 16 situated radially inward of the plate 20. More specifically, the second sealing member 106 includes an aft axially extending pair of appendages 108, 110 that define a channel 112 therebetween. The appendages 108, 110 are positioned such that they are adjacent and intersect the forward face 68 of each plate 20 and the forward face (not shown) of each post 14. In the channel 112 of the second sealing member 106 is a second wire 114. The second sealing member 106 is coupled to the assembly 10 between the disk and a forward, additional stage 1 disk (not shown). The compressive axial load on the second seal member between the disk and the forward disk (not shown) keeps the second seal member 106 flush with the forward face 51 of the post 14 and the forward face 68 of the seal plate 20. As discussed hereinbelow in more detail, the wires 104, 114 and the sealing members 82, 106 are configured to follow the thermal expansion of at least a portion of the assembly 10 and maintain the seal of the slots 16.

Figure 5:
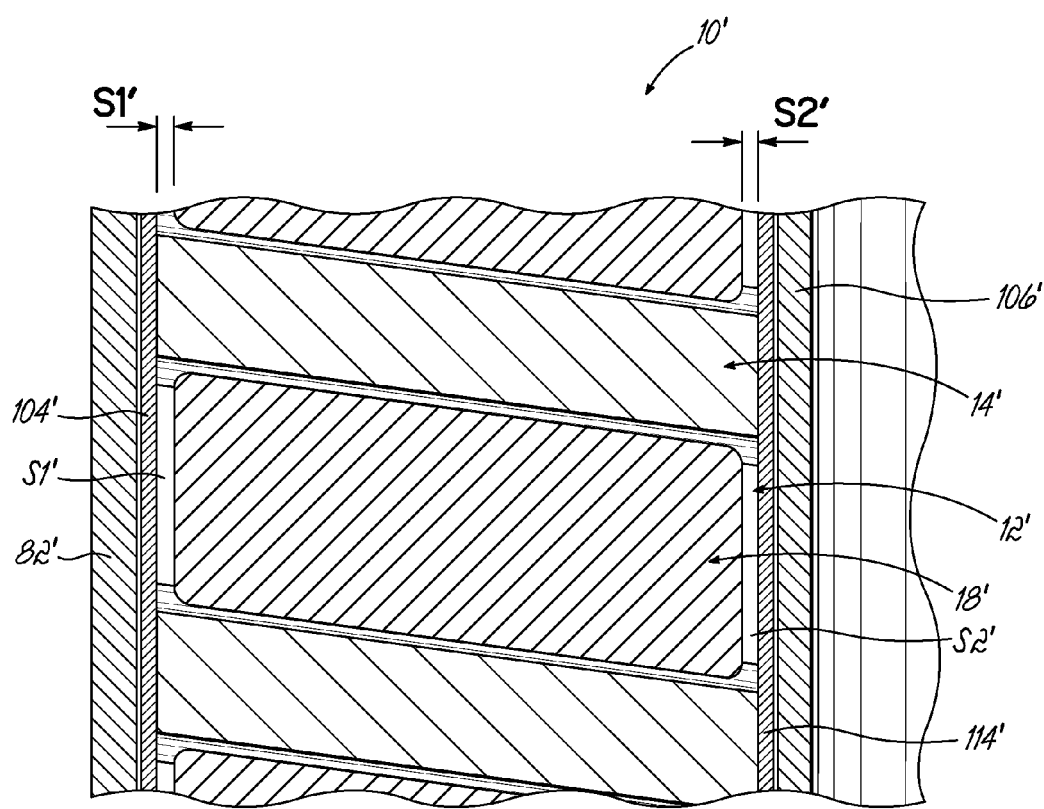
FIG. 5 is a top cross-sectional view of a prior art disk and blade assembly.

Providing the seal plate 20 in the assembly 10 is advantageous for the reasons described herein. A system of the prior art is shown in FIG. 5 and does not include a seal plate 20 with a similar coefficient of thermal expansion of at least a portion of the assembly 10, such as the posts 14. In the prior art assembly 10' shown in FIG. 5, for example, the disk 12' and posts 14' comprise the same first material having the same coefficient of thermal expansion and the blades 18' comprise a different second material having a different coefficient of thermal expansion. For example, the disks 12' and the posts 14' comprise metal and the blades 18' comprise, for example, a ceramic or composite material. In the prior art design shown in FIG. 5, the wires 104', 114' and the sealing members 82', 106' are configured such that they are adjacent and intersect the disks 12' and the posts 14'. As the prior art system experiences a change in ambient temperature, such as residual heat from a combustor portion of a turbine engine, the assembly 10' naturally thermally expands in at least the axial direction (both forward and aft). Because the posts 14' and the blades 18' comprise different materials having different coefficients of thermal expansion, the posts 14' and blades 18' expand different amounts and at different rates. As shown in FIG. 5, the posts 14' have thermally expanded a greater amount. The thermal expansion of the posts 14' is followed by the wires 104', 114' and the first and second sealing members 82', 106'. Due to the disparate thermal expansion between the posts 14' and the blades 18', axial spaces S1', S2' are created on the aft and forward sides of the prior system. This space SF, S2' leads to leakage of air which, as discussed herein, disadvantageously affects the airflow within the turbine. Leakage may reduce the efficiency of the turbine and therefore increase the specific fuel consumption thereof.

Figure 6:
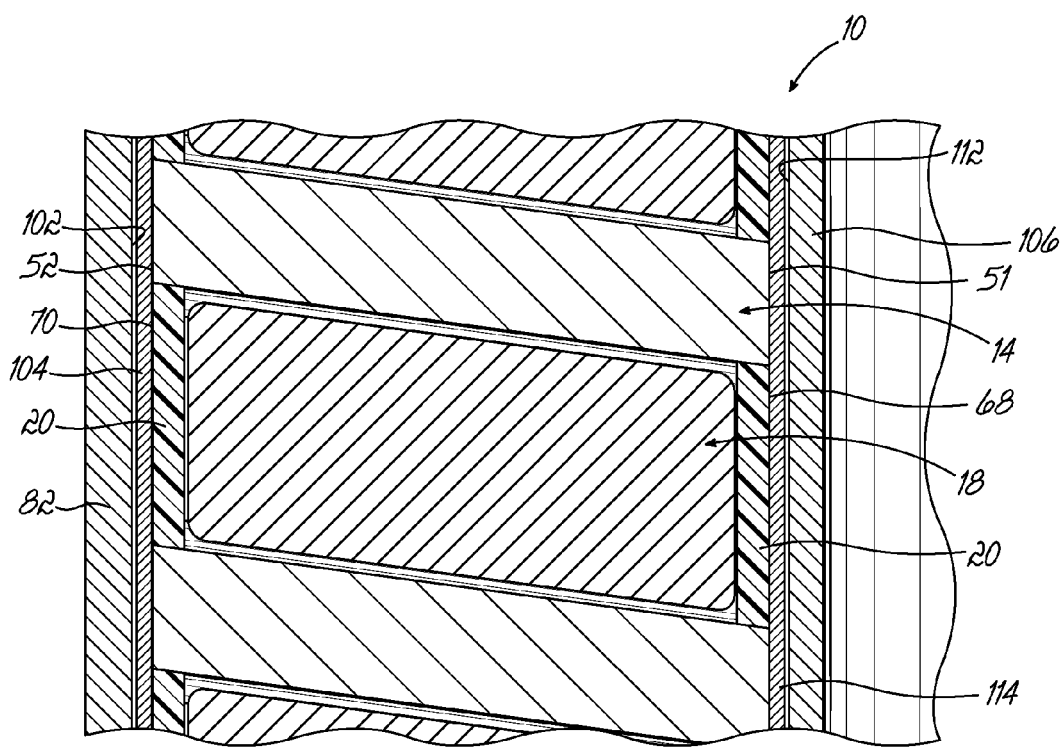
FIG. 6 is a top cross-sectional view of the system of FIG. 4.
Figure 7:
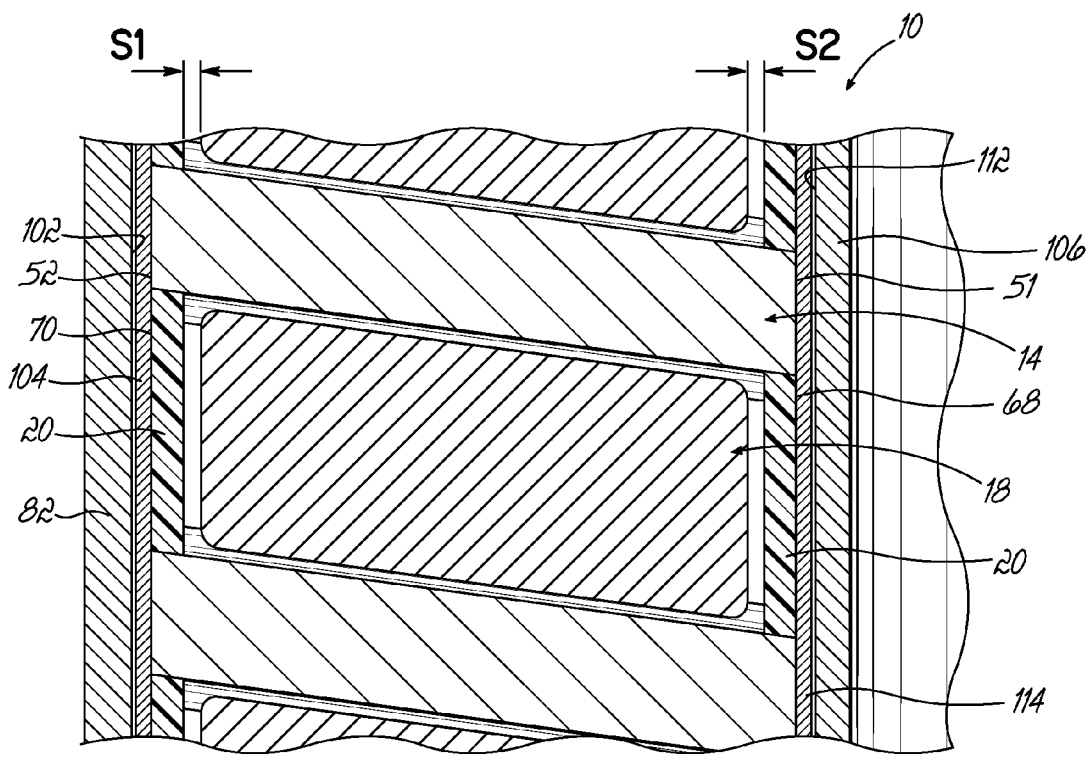
FIG. 7 is a top cross-sectional view showing the system of FIG. 4 experiencing thermal expansion.

FIGS. 6 and 7 show one embodiment of a system for preventing air leakage in a turbine, which includes a plate 20 with a same or similar coefficient of thermal expansion of at least a portion of the assembly 10. The embodiment shown in FIGS. 6 and 7 includes a seal plate 20 with a same or similar coefficient of thermal expansion of at least a portion of the assembly 10. More specifically, the plate 20 comprises a material with a same or similar coefficient of thermal expansion as the posts 14. To highlight the behavior of the wires 104, 114 and the first and second sealing members 82, 106 as the system experiences a change in ambient temperature, FIGS. 6 and 7 show a cross-section intersecting the wires 104, 114. As described herein, the middle portion 88 of the first sealing member 82, which is positioned on the aft side, includes a forward axially extending pair of appendages 98, 100 that define a channel 102 therebetween. The middle portion 88 is positioned such that it is adjacent and intersects the aft face 70 of each plate 20 and the aft face 52 each post 14. In the channel 102 of the first sealing member 82 is a first wire 104. The second sealing member 106 includes an aft axially extending pair of appendages 108, 110 that define a channel 112 therebetween. The appendages 108, 110 are positioned such that they are adjacent and intersect the forward face 68 of each plate 20 and the forward face 51 of each post 14. In the channel 112 of the second sealing member 106 is a second wire 114.

As the system experiences a change in ambient temperature, as shown in FIG. 7, such as residual heat from a combustor portion of a turbine engine, the assembly 10 naturally thermally expands in at least the axial direction. Because the posts 14 and plates 20 comprise materials having different coefficients of thermal expansion than the blades 18, the posts 14 and plates 20 expand different amounts and at different rates than the blades 18, potentially leading to a space S1, S2 forming between the plate 20 and the blade 18, which does not present the same problems as the axial spaces S1', S2' between the seal members 82', 106' and the assembly 10', as discussed above with respect to the prior art device of FIG. 5. However, due to the plate 20 having a same or substantially similar coefficient of thermal expansion as the disk 12 and the posts 14, the plates 20 and the posts 14 thermally expand at a same rate and a same amount. Due to the configuration of the wires 104, 114 and the first and second sealing members 82, 106, the wires 104, 114 and the sealing members 82, 106 follow the expansion of the plates 20, preventing the axial spaces S1', S2' present when the prior art device experiences a change in ambient temperature. The amount of thermal expansion can be calculated by $\Delta L = L*\alpha*\Delta T$, where L is the length of the object in question, $\alpha$ is the coefficient of thermal expansion, and $\Delta T$ is the change in temperature. Therefore, the relative thermal expansion or contraction between multiple components depends on each of these variables, such as the geometry of each component. In the prior art shown in FIG. 5 of the prior art, the blades 18 and the posts 14 do not include the same or substantially similar coefficient of thermal expansion. Materials with a substantially similar coefficient of thermal expansion, in the embodiments shown in FIGS. 6 and 7, each expand an amount such that gaps (like those shown as S1' and S2' in prior art FIG. 5) of 0.012" (0.305 mm) or less is created between the wires 104, 114 and one of either the seal plate 20 or the post 14. The disclosure herein, however, is not limited to such a gap size to define materials or components having a substantially similar coefficient of thermal expansion, and the person skilled in the art will recognize that the $\Delta L$ is dependent upon three variables as discussed above, with coefficient of thermal expansion being only one. Moreover, these values provided are only examples and may be different depending on the application involved, such as between which turbine components a seal is desired.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A system for preventing air leakage within a turbine, comprising:
    a turbine disk including a plurality of disk posts extending radially therefrom and a plurality of disk slots between adjacent disk posts, said turbine disk being of a first material having a first coefficient of thermal expansion;
    a plurality of turbine blades, one of said turbine blades being received in each said disk slot, said turbine blades being of a second material having a second coefficient of thermal expansion; and
    a plurality of seal plates, wherein one of said seal plates is positioned in each disk slot radially inward of the turbine blade, said seal plates being of a material having a coefficient of thermal expansion substantially similar to that of either said disk posts or said turbine blade such that said seal plates thermally expand or contract an amount similar to a thermal expansion or contraction of at least one of the plurality of disk posts or the plurality of turbine blades; and
    a sealing member coupled with at least a portion of said assembly and configured to seal said disk slots, wherein a first end of said sealing member couples with said turbine blades, a second end of said sealing member couples with said turbine disk, and a middle portion between said first and second ends of said sealing member couples with said seal plates and one of the plurality of turbine blades or plurality of disk posts.

2. The system of claim 1, wherein:
    said seal plates comprise one of said first or second materials.

3. The system of claim 1, wherein at least a portion of a shape of each said seal plate is essentially complementary to at least a portion of each said disk slot.

4. The system of claim 1, wherein:
    when said assembly experiences a change in ambient temperature, said sealing member follows the thermal expansion or contraction of at least a portion of said assembly and maintains the seal of said disk slots.

5. The system of claim 1, wherein said sealing member envelops at least a portion of each said disk slot.

6. The system of claim 1, wherein:
    said middle portion couples with said seal plates and said disk posts;
    said first end follows the thermal expansion of said turbine blades;
    said second end follows the thermal expansion of said turbine disk; and
    said middle portion follows the thermal expansion of said seal plates and said disk posts.

7. The system of claim 1, further comprising:
a wire positioned on said assembly adjacent at least a portion of each plate.

8. The system of claim 7, further comprising:
a channel in said sealing member, wherein said wire is positioned in said channel.

9. The system of claim 7 wherein said wire is adjacent an axially facing face of each seal plate.

10. The system of claim 7, wherein said wire follows the thermal expansion of at least a portion of said assembly.

11. A method of preventing air leakage within a turbine, comprising:
assembling a turbine blade and disk assembly, the assembly comprising a turbine disk including a plurality of disk posts extending radially therefrom and a plurality of disk slots between adjacent disk posts, the turbine disk and disk posts being of a first material having a first coefficient of thermal expansion, and plurality of turbine blades, each turbine blade being of a second material having a second coefficient of thermal expansion, the assembling step further comprising:
positioning one turbine blade in each disk slot; and
positioning one seal plate in each disk slot radially inward of each turbine blade, each seal plate being of a material having a coefficient of thermal expansion substantially similar to that of either the disk posts or the turbine blades such that the seal plates thermally expand or contract an amount similar to a thermal expansion or contraction of at least one of the plurality of disk posts or the plurality of turbine blades; and
coupling a sealing member with at least a portion of the assembly such that the sealing member seals at least a portion of each disk slot; and
coupling a first end of the sealing member with the blades; coupling the second end of the sealing member with the disk; and coupling a middle portion of the sealing member between the first and second ends with the plates and one of the plurality of blades or plurality of posts.

12. The method of claim 11, wherein when the assembly experiences a change in ambient temperature, the sealing member follows the thermal expansion or contraction of at least a portion of the assembly and maintains the seal of the slots.

13. The method of claim 11, further comprising:
coupling the middle portion with the plates and the posts.

14. The method of claim 11, wherein the coupling step further comprises enveloping at least a portion of each slot with the sealing member.

15. The method of claim 11, further comprising:
positioning a wire on the assembly adjacent to at least a portion of each plate.

16. The method of claim 15, wherein the wire is further positioned adjacent an axially facing face of each plate.

* * * * *

UNITED STATES PATENT AND TRADEMARK OFFICE
CERTIFICATE OF CORRECTION

PATENT NO. : 9,453,422 B2  
APPLICATION NO. : 13/790758  
DATED : September 27, 2016  
INVENTOR(S) : Hile et al.

Page 1 of 1

It is certified that error appears in the above-identified patent and that said Letters Patent is hereby corrected as shown below:

On the Title Page

In Item (71), under "Applicant", in Column 1, Line 2, delete "Shenectady," and insert -- Schenectady, --, therefor.

In Item (72), under "Inventors", in Column 1, Line 2, delete "Brian Agnew," and insert -- Brian Jared Agnew, --, therefor.

In the Specification

In Column 6, Line 63, delete "SF," and insert -- S1', --, therefor.

Signed and Sealed this  
Fourteenth Day of March, 2017

Michelle K. Lee  
*Director of the United States Patent and Trademark Office*